United States Patent
Beeson et al.

(10) Patent No.: US 11,745,282 B2
(45) Date of Patent: Sep. 5, 2023

(54) INTEGRATED ENGINE-DRIVEN GENERATOR CONTROL SYSTEM

(71) Applicant: Illinois Tool Works Inc., Glenview, IL (US)

(72) Inventors: Richard Beeson, Appleton, WI (US); Daniel C. Fosbinder, Appleton, WI (US); Michael J. Trinkner, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/790,989

(22) Filed: Oct. 23, 2017

(65) Prior Publication Data

US 2018/0104760 A1    Apr. 19, 2018

Related U.S. Application Data

(63) Continuation of application No. 12/362,925, filed on Jan. 30, 2009, now Pat. No. 9,796,037.

(51) Int. Cl.
*B23K 9/10* (2006.01)

(52) U.S. Cl.
CPC ................. *B23K 9/1056* (2013.01)

(58) Field of Classification Search
CPC . A23G 9/22; A23G 9/26; A23G 9/285; A23G 9/48; A23G 9/503; B26D 3/08; B23K 9/1056; B23K 9/0956; B23K 9/1081; F02D 41/1497; F02D 41/401; F02D 9/04; F02D 41/06; F02B 29/0437; F02B 29/0425; F02B 29/0412; F02B 3/06; F02B 29/0493; F02B 37/00; Y02T 10/12; Y02T 10/40; Y02T 10/44; Y02T 10/146
USPC ........... 219/133, 134, 130.1, 130.01, 130.21, 219/130.33; 290/40 B, 40 C, 400; 123/378, 542, 179.18, 142.5 R
See application file for complete search history.

(56) References Cited

U.S. PATENT DOCUMENTS

| | | | | |
|---|---|---|---|---|
| 4,629,968 A | * | 12/1986 | Butts | ................. H02P 9/107 322/28 |
| 5,591,362 A | | 1/1997 | Feldhausen | |

(Continued)

FOREIGN PATENT DOCUMENTS

| | | | |
|---|---|---|---|
| JP | 2001018063 A | * | 1/2001 |
| JP | 2003284397 A | * | 10/2003 |

OTHER PUBLICATIONS

Machine translation of Japan Patent No. 2001018,063-A, Dec. 2022.*

(Continued)

*Primary Examiner* — Geoffrey S Evans
(74) *Attorney, Agent, or Firm* — McAndrews, Held & Malloy, Ltd.

(57) ABSTRACT

An engine-driven welder/generator is controlled by an integrated controller that is coupled to both the engine and to the welder/generator. The controller receives input signals for operational parameters of the engine, and additional signals indicative of electrical output by the welder/generator. Operation of the engine and welder/generator may thus be coordinated. The controller may control speed, timing, fuel injection, and so forth of the engine, and output of the welder/generator, such as by control of input to a field coil.

12 Claims, 7 Drawing Sheets

(56) References Cited

U.S. PATENT DOCUMENTS

| | | | |
|---|---|---|---|
| 5,861,604 A * | 1/1999 | McLean | B23K 9/0671 |
| | | | 219/130.4 |
| 5,968,385 A | 10/1999 | Beeson | |
| 5,988,140 A | 11/1999 | Gartner | |
| 6,051,806 A | 4/2000 | Shikata et al. | |
| 6,111,217 A | 8/2000 | Beeson | |
| 6,118,186 A | 9/2000 | Scott | |
| 6,121,691 A | 9/2000 | Renner | |
| 6,153,855 A | 11/2000 | Renner | |
| 6,166,349 A | 12/2000 | Williams | |
| 6,310,321 B1 | 10/2001 | Beeson | |
| 6,348,671 B1 | 2/2002 | Fosbinder | |
| 6,359,259 B1 | 3/2002 | Bunker | |
| 6,469,276 B1 | 10/2002 | Renner | |
| 6,469,401 B2 | 10/2002 | Beeson | |
| 6,528,765 B2 * | 3/2003 | Bunker | B23K 9/1006 |
| | | | 219/130.21 |
| 6,590,298 B1 | 7/2003 | Du Plessis | |
| 6,603,097 B2 * | 8/2003 | Leisner | B23K 9/1006 |
| | | | 219/133 |
| 6,603,213 B1 | 8/2003 | Renner | |
| 6,644,272 B2 * | 11/2003 | Furukawa | F02B 29/0412 |
| | | | 123/142.5 R |
| 6,674,179 B2 | 1/2004 | Beeson | |
| 6,713,887 B2 | 3/2004 | Shimizu | |
| 6,812,584 B2 | 11/2004 | Renner | |
| 6,825,576 B1 | 11/2004 | Blackburn | |
| 6,894,401 B2 | 5/2005 | Beeson | |
| 7,112,945 B2 | 9/2006 | Beeson | |
| 7,312,419 B2 | 12/2007 | Beeson | |
| 2004/0108728 A1 | 6/2004 | Renner | |
| 2005/0263511 A1 * | 12/2005 | Fosbinder | B23K 9/095 |
| | | | 219/130.01 |
| 2005/0263515 A1 * | 12/2005 | Fosbinder | B23K 9/0953 |
| | | | 219/133 |
| 2006/0027548 A1 | 2/2006 | Albrecht | |
| 2006/0157459 A1 * | 7/2006 | Fosbinder | B23K 9/1056 |
| | | | 219/133 |
| 2008/0116695 A1 | 5/2008 | Peterson | |
| 2008/0157540 A1 | 7/2008 | Fattal | |
| 2008/0308541 A1 | 12/2008 | Hiroi | |
| 2010/0171364 A1 | 7/2010 | Awwad | |

OTHER PUBLICATIONS

Machine translation of Japan Patent No. 2003284397A, Dec. 2022.*
Int'l Search Report and Written Opinion for PCT/US2009/66009 dated Jan. 21, 2010.
Miller Unchain Your Productivity Power Management Technology: Mar. 2004.
Experience the Freedom of Auto-Line; www.millerwelds.com/education/autoline.html; 2008 Miller Electric Mfg. Co.

* cited by examiner

INTEGRATED ENGINE-DRIVEN GENERATOR CONTROL SYSTEM

BACKGROUND

The invention relates generally to a system and method for controlling an engine driving a generator through the use of control circuitry that integrates control functions of both the engine and the generator.

Engine-driven generators are commonly used to provide electrical power in locations where conventional electrical power is not readily available. Both gasoline and diesel engines are used to drive such generators, and the power produced is typically either 120 VAC or 240 VAC. An engine-driven generator may be used to supply power to a welding gun (e.g., torch, arc, or the like) for applications such as, for example, stick electrode welding, MIG welding, TIG welding, etc. These welding systems include a control system to regulate the power produced by the generator, thereby making it suitable for arc welding, plasma cutting, and similar operations.

Typical welding systems offer the user little customizable control over the engine settings. For example, the engine may employ an engine governor to control the engine speed. When the welding gun or an auxiliary device is connected to the system and turned on, the engine speed may increase to the speed required to power the load. This speed increase may be determined by a generic governor curve which slowly increases the engine speed to substantially prevent overshooting the required speed. No distinction is made between the weld load and the auxiliary load, such as a light, which may require significantly less power to operate than the welder.

In addition, during periods of non-use of the typical welding system, the engine speed may be reduced to an idle speed. However, this idle speed may still consume a great deal of energy and produce substantial noise levels. A user may have no choice but to endure these inconveniences or to manually turn the engine off when it will not be used for some time. The engine must then be manually restarted before the welding gun may be used again.

One reason for such limited control options has been the virtually completely separate design and configuration of engines and the generator systems that they ultimately drive in such applications. In general, engines are designed for a wide range of applications, and whether controlled by mechanical or electronic means, typically self regulate based upon known speed, torque and power relationships, and knowledge of factors such as fuel flow rates needed to produce desired speeds. At the same time, generator system manufactures typically design separate controls that regulate output of the generators in response to demand, and that at best provide inputs to the engine controller. However, little additional coordination in control is typically provided.

BRIEF DESCRIPTION

The invention provides a much more integrated control scheme for regulating operation of an engine and a welder/generator. The system includes both an engine and a welder/generator. An integrated controller receives input of sensed parameters from both the engine and the welder/generator, and can control both. For example, the controller may regulate engine speed, spark timing, fuel injection, and so forth for the engine. The controller may also regulate operational parameters of the welder/generator, such as input to a field coil. The control may also be based on user inputs, such as weld settings.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present invention relates to control of an engine driving an electrical generator. An engine powering a generator/welder may include controls which affect the engine speed, ignition, fuel injection, spark timing, and any other controllable parameter of the engine based on various inputs. Such inputs may include, for example, currents or voltages supplied to loads, such as a welding gun and/or an auxiliary device, preset welding parameters, and time.

Figure 1:
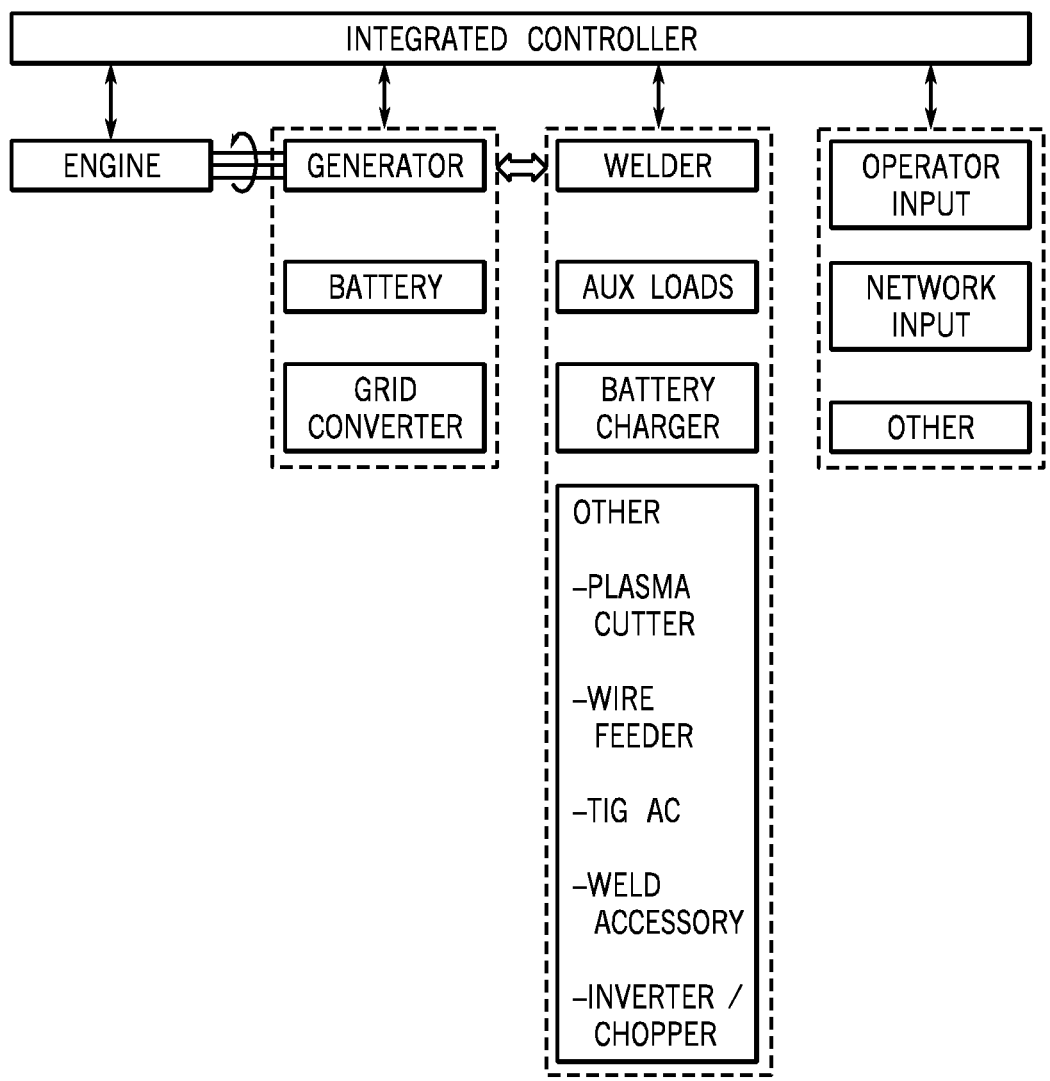
FIG. 1 is a diagrammatical overview of an integrated engine and generator control scheme in accordance with certain aspects of the invention, permitting improved control of engine and generator functions.

FIG. 1 is a diagrammatical overview of an exemplary integrated engine and generator control scheme in accordance with aspects of the present invention. As described in greater detail below, the system can be applied to a range of engines, such as gasoline engines and diesel engines. Moreover, the engine may include a wide range of measurable, observable and controllable parameters, such as, by way of example only, fuel flow, throttle position, speed, torque, power, spark advance (e.g., for gasoline engines), and so forth. Certain of these controls may be implemented mechanically, electromechanically or electronically, such as through the use of an electronic governor. In general, the engine will be started and will operate at speeds as determined by an integrated controller illustrated in FIG. 1. The integrated controller can cause the engine to operate at particular speeds depending upon optimal operating conditions, draw by particular loads, as summarized in greater detail below, and so forth.

In the embodiment illustrated in FIG. 1, the engine will drive a generator. Indeed, while the generator represents a load for the engine, the generator is, itself, a power source for electrical loads. In the diagrammatical illustration of FIG. 1, other electrical power sources may also be included in the system, such as batteries, grid converters configured to draw power from an electrical grid and to provide it to electrical loads. In certain presently contemplated systems, the generator will operate in parallel with other electrical power sources such as batteries and grid converters. In terms of the engine operation, the loads are drawing electrical power from the generator, and/or other electrical power sources, can influence the control of the engine by the intermediary of the integrated controller. Thus, electrical parameters may be sensed for the generator, batteries, grid converters, and other electrical power sources and the integrated controller may use these sensed parameters to control the operation and performance of the engine. It should also be noted that the integrated controller may also regulate certain functions of the electrical power sources. For example, the controller may regulate a field of the generator so as to control power production by the generator in accordance with needs of electrical loads and coordinated with speed and torque control of the engine. In presently contemplated applications, the electrical power sources will generate controlled electrical power which is available for a variety of loads. The electrical power may be a function of the speed at which the engine turns the generator and the number of poles included in the generator, or this power may further processed as described below.

FIG. 1 also illustrates a number of exemplary loads that may draw electrical power from the electrical power sources, including the engine-generator set. In the presently contemplated embodiments, these include a welder and certain auxiliary loads. As will be appreciated by those skilled in the art, the welder requires significant power for creation of electrical arcs used to fuse metals in welding operations. The welder illustrated in FIG. 1 may convert power from the generator to power appropriate for the particular welding operation to be performed. As also described below, such welding operations may require constant voltage output regimes, constant current regimes, or various pulsed regimes, depending upon the nature of the welding operation. Auxiliary loads may include both alternating current and direct current loads, with output from the power sources being converted as necessary for the particular loads. In certain embodiments, the integrated controller may operate the engine at appropriate speeds and power levels to accommodate both welding loads and auxiliary loads. For example, tools, lights, and other loads designed to operate on alternating current at frequencies of a power grid (e.g., 60 Hz in North America) may require the engine to operate at specific speeds, depending on the number of pulls of the generator. The integrated controller may sense output of the generator and output of the loads, or draw by the loads to regulate engine speed accordingly.

Other loads that may be powered by the system illustrated in FIG. 1 may include a battery charger. In many mobile applications, for example, it may be useful to drive the engine as an auxiliary power source to charge a vehicle battery. Several other loads are also illustrated in FIG. 1, by way of a non-exhaustive list. Such other loads may include plasma cutters, wire feeders, alternating current sources used for specific operations, such as tungsten inert gas (TIG) welding, various welding accessories, power converters, such as inverters and choppers, and so forth. As with the welder and the auxiliary loads discussed above, the integrated controller may coordinate operation of the engine and/or generator to accommodate such loads based, for example, upon detection of connections, power draw, signatures of particular tools, and so forth.

The integrated controller may also take into account for control of the engine and/or generator, inputs from a variety of sources, several of which are listed in the diagram of FIG. 1. Presently contemplated sources for control include various operator inputs. Such operator inputs may be included in a control panel or human interface on the welders/generator cabinet. By way of example, operator inputs may set weld parameters as discussed below. However, operator inputs may also include manual override of speeds, manual input of desired noise or fuel usage, and so forth. Inputs may also be networked as illustrated in FIG. 1. Such networked inputs may include, for example, inputs received via a dedicated network connection, a LAN connection, a WAN connection, wirelessly, and so forth. Indeed, any of the inputs or even controlled parameters are regulated by the integrated controller may be input by an operator or by a network. Other input sources may include commands or requests for specific power or electrical parameters from any one of the loads coupled to the electrical power sources. Such inputs may further include devices coupled directly or indirectly to the engine and not through the electrical power sources. For example, in certain applications the engine may drive other devices (not shown in FIG. 1) such as air compressors, hydraulic pumps, and so forth, and the integrated controller may receive inputs indicating that such devices are active and join power from the engine, and alter the engine speed, fuel flow rate, output torque or power, and so forth based upon such inputs.

The integrated controller itself may take any suitable form, and will typically include one or more power supplies and one or more processors with associated memory for storing sensed parameter values, control programs, and so forth. Because the system, in many applications, will be mobile, the integrated controller will typically be packaged in a robust manner capable of operation in difficult environmental conditions along with the engine, generator, and other components of the system. The processor may include any suitable digital processor, such as microprocessors, field programmable gate arrays, and so forth. Memory devices may be provided as part of the processor package, such as in the case of a field programmable gate array, an additional memory may include flash memory, random access memory, read only memory, programmable read only memory, and so forth. The control routines for regulating operation of the engine and the generator may be written in any suitable computer language, and such code is considered to well within the ambit of those skilled in the art based upon the various control regimes discussed below.

The degree of integration of control implemented by the integrated controller may vary depending upon the sophistication of the control regimes envisaged. For example, as described in greater detail below, the integrated controller may sense certain electrical parameters of the power sources, and particularly those of the generator, and perform relatively simple operations, such as speed control based on throttle positions, fuel flow rate, and so forth for the engine. Much more sophisticated control regimes may, however, be implemented in which the controller regulates both parameters of the engine and parameters of the generator to accommodate particular loads and power needs.

As discussed above, depending upon the engine design, the generator design, and the anticipated loads, the integrated controller may perform various functions specifically adapted for those machines. In certain presently contemplated applications, for example, many functions of the engine may be controlled mechanically, and the engine may be based upon carborated fuel mixing. In other applications, the engines will include fuel injected versions. Mechanical or electronic governors may be accommodated, with carborated fuel mixing or fuel injection. As will be appreciated by those skilled in the art, for mechanical governors, the controller generally will not control the throttle position. Similarly, engines in the system may be single cylinder, twin cylinder, three cylinder or more, and may be liquid or air cooled.

As also mentioned above, control may be based upon the particular design of the generator and any other electrical power sources in the system. For example, in certain presently contemplated designs, the generator may employ an electrical rheostat for field control. Such field control may be regulated by the integrated controller. In such applications, the integrated controller may also control injectors for the engine, and all of such control may be based upon inputs from a welder, auxiliary loads of various types, and so forth.

Figure 2:
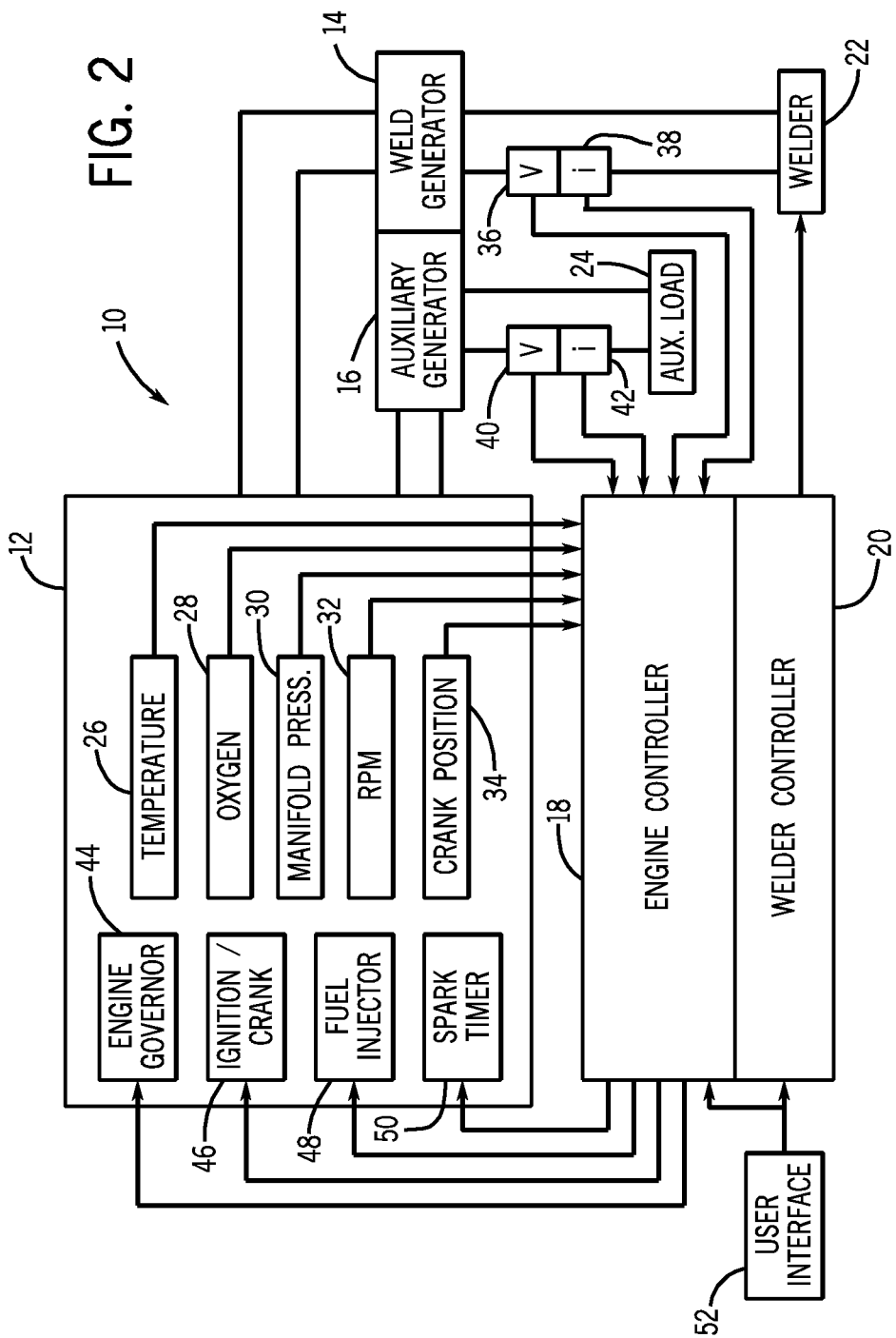
FIG. 2 is a block diagram of an engine-driven generator/welder system according to an embodiment of the present invention.

FIG. 2 illustrates an engine driven welding and power generating system 10 in accordance with an embodiment of the present invention. The system 10 generally includes an engine 12, a weld generator 14, and a generator 16 for providing auxiliary power output. An integrated control system includes an engine controller 18 and a welder controller 20, which can be fully or partially integrated to receive inputs for control from the engine, the weld generator and the auxiliary generator, and produce outputs for control of the engine, the generator, or both. The weld generator provides power for a welder 22, which may be controlled by the weld controller 20. The welder will typically include a welding gun (e.g., a MIG or TIG torch, stick handle, etc.). Various auxiliary loads or devices 24 (e.g., lights, power tools, radios, etc.) may be powered by power from the auxiliary generator 16. The engine 12 may be a gasoline or diesel engine which drives the generators.

As illustrated in FIG. 2, the controller 18 may receive inputs from the engine 12, a user interface 52, and/or power outputs from the generators. For example, sensors disposed within or coupled to the engine 12 may provide engine information to the controller 18 relating to engine operating conditions, settings, transient conditions, and so forth. Exemplary sensors may include a temperature sensor 26, an oxygen sensor 28, a manifold pressure sensor 30, an RPM sensor 32, a crank position sensor 34. Further engine sensors may detect information regarding the throttle position, the fuel injection rate, the spark timing, mass air flow rate, and so forth. In addition, sensors coupled to the one or more power outputs of the generators 14 and 16 may provide information about loads drawing power from the generators (e.g., the welder 22 and/or the auxiliary loads 24). For example, a voltage sensor 36 and/or a current sensor 38 may be coupled to power output lines of the generator 14 to enable the controller to determine whether a load (e.g., welder 22) is drawing power from the generator, and the level of power draw. Similarly, a voltage sensor 40 and/or a current sensor 42 may be coupled to power output lines of generator 16 to detect draws from that generator. User inputs (e.g., preset operating parameters) may also be supplied to the controller via the user interface 52. Exemplary preset operating parameters may include current and voltage requirements, process type (e.g., constant current, constant voltage, MIG, TIG, stick), wire electrode or stick size, and so forth. The user interface 24 may be integral with the system or may be an independent device, such as, for example, an input panel, a remote control system, and so forth. The user interface 24 may include, for example, a user input device such as a keypad, a keyboard, a mouse, a touch-screen, dials, switches, potentiometers, LEDs, lights, etc., and a display, such as a monitor, a CRT display, an LCD screen, etc.

In addition to receiving engine, process, and load information from inputs, the controller may send control signals to various engine systems. As described in more detail below, the controller may process some or all of the information gathered from the sensors 38-42 and/or input via the user interface 52 to alter engine operation settings. For example, the controller may manage an engine governor 44 (e.g., via a throttle plate), the ignition or crank timing 46, a fuel injector 48 and its timing, a spark timer 50, or any other engine component which may be controlled. To process all of the signals input to and output from the controller, the controller may, for example, include discrete analog and/or digital circuits, a logic device, a microprocessor, a microcontroller, a programmable logic controller, a field-programmable gate array, a complex programmable logic device, etc.

Figure 3:
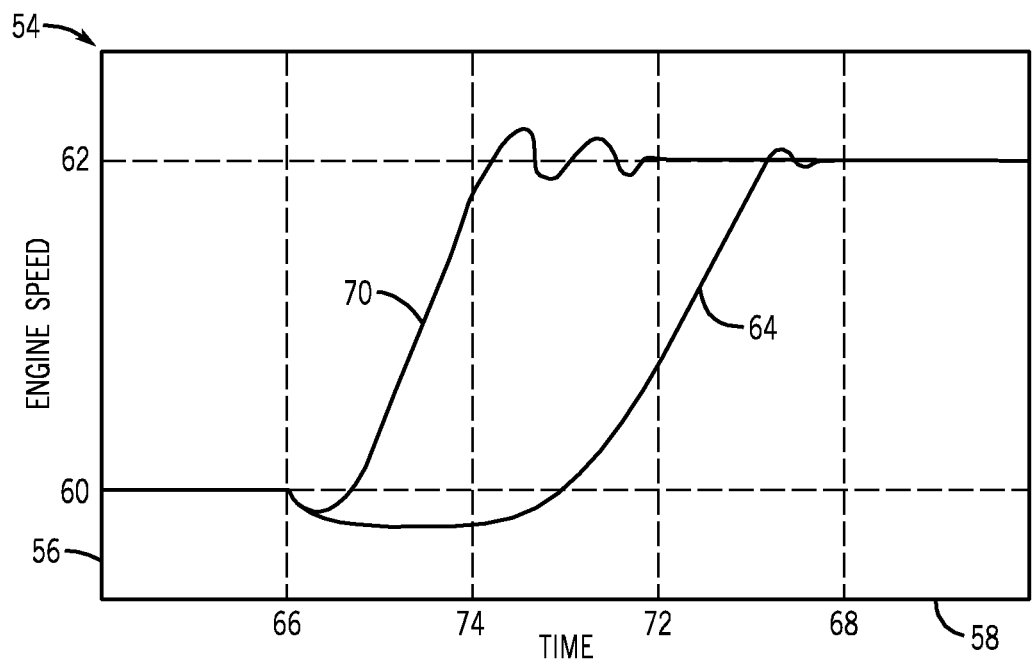
FIG. 3 is an engine speed graph according to an embodiment of the present invention.

FIG. 3 is a graph 54 of generator speed 56 (e.g., revolutions per minute) versus time 58 in accordance with embodiments of the present invention. Referring generally to FIG. 2 for the components of system 10 and to FIG. 3 for the graph 54, an idle speed 60 may be around 1800-2400 rpm for an internal combustion engine such as a two-cylinder gas engine. In another embodiment, a diesel engine may operate with an idle speed around 600-1200 rpm. The engine 18 powering the weld generator 14 and the auxiliary generator 16 may operate at an operating speed 62. Generally, the normal operating speed 62 is the engine speed at which a synchronous power output frequency is produced. American devices typically utilize a 60 Hz frequency, and other devices utilize a 50 Hz frequency. The normal operating speed 62 of an exemplary two-cylinder gas engine may be about 3600 rpm, producing an alternating current with a frequency of about 60 Hz. An engine driven, four-pole generator may produce a 60 Hz frequency at about 1800 rpm. The engine operating speed 62 may be approximately based on the following equation:

$$s = \frac{120f}{P}, \qquad (1)$$

where s is the speed of the engine (rpm), f is the target frequency (Hz), and P is the number of poles in the generator. Other idle and operating speeds 60 and 62 may be used depending, for example, on the engine type (e.g., gasoline or diesel) and the engine design (e.g., number of cylinders, number of poles, etc.).

A trace 64 illustrates ramp-up of the engine speed 56 from the idle speed 60 to the operating speed 62 as observed in traditional engine control systems. For example, the welder 22 and/or the auxiliary load 24 may be turned on at a time 66. Due to the increase in required torque when the engine load is increased, the speed 56 of the engine 12 initially decreases. After some time, the engine governor 44 detects the change in the engine speed 56 and increases the fuel flow rate to increase the engine speed 56 to compensate for the increased load. The engine speed 56 then increases to the operating speed 62 based on a governor curve. A traditional rpm-based control regime may utilize a generic governor curve to ramp up the engine speed 56 to the required speed for a given load (and to maintain the speed in an rpm-closed loop). That is, the engine speed 56 is ramped up relatively slowly so that the required speed for a given load is not greatly surpassed (i.e., to limit "overshoot"). To reach and maintain the operating speed 62, the controller may employ various control techniques, such as, for example, closed-loop control, open-loop control, PID control, direct pole placement, optimal control, adaptive control, intelligent control, non-linear control, etc. After a time 68, the engine speed 56 is generally constant at the operating speed 62. As can be seen in the graph 54, the trace 64 exhibits a significant droop after the load is introduced before the governor 44 begins to ramp up the engine speed 56.

In contrast, a trace 70 illustrates an improved technique for ramping up the engine speed 56 when the welder 22 draws power from generator 14. A user may input settings, such as the required current and voltage for the welder 22, via the user interface 52. The controller may then sense when the welder 22 is operative by monitoring the drawn voltage and current via the sensors 36 and 38 on the welding power output. Upon detection of a draw on the generator 14, the controller may send a signal to the engine governor 44 to immediately begin ramping up the engine speed 56 based on a modified governor curve. For example, the user-input settings may be utilized in a lookup table, an algorithm, etc. to determine the governor curve which most efficiently increases the engine speed 56 to the desired operating speed 62. The controller 22 may store information on any number of input-specific governor curves in addition to the generic governor curve. When the welder 22 begins to draw power at the time 66, the engine speed 56 may decrease briefly under the load. However, because a signal is sent to the engine governor 44 as soon as the draw is detected, the governor 44 begins ramping up the engine speed 56 much faster than in the traditional engine control system illustrated by the trace 64. Therefore, the engine speed 56 may be generally constant at the operating speed 62 after a time 72. The delay from the onset of engine loading to the time 72 may be significantly less than that to the time 68 (traditional control) at which the trace 64 maintains the operating speed 62.

Furthermore, the controller may employ different control regimes at different times in the ramp-up and speed maintaining process. For example, trace 70 illustrates a preset-based control regime further illustrated in FIG. 4. In contrast, trace 64 illustrates a traditional rpm-based control regime. As can be seen in the graph 54, the preset-based control regime (trace 70) could overshoot the operating speed 62 to a greater extent than the rpm-based control regime (trace 64). This phenomenon may be attributed to the techniques employed by the respective control regimes in increasing the engine speed 56. To combine the increased speed ramp-up in the preset-based control regime with the stabilization of the rpm-based control regime, the controller may switch from one control regime to the other, such as depending on the engine speed 56. For example, at a time 74, as the engine speed 56 approaches the target operating speed 62 using the preset-based control regime (trace 70), the controller may switch to the rpm-based control regime (trace 64). By changing control regimes, the benefits of each type of control may be optimized.

Figure 4:
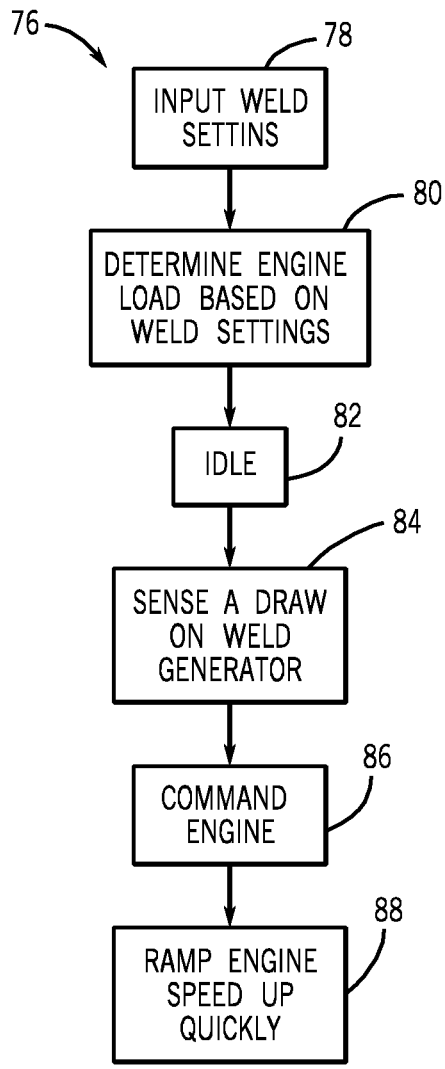
FIG. 4 is a flow chart illustrating an engine control process for producing a series illustrated in the engine speed graph of FIG. 3 according to an embodiment of the present invention.

FIG. 4 illustrates a process 76 by which the trace 70 (FIG. 3) may be generated. Referring to FIG. 2 for the components of system 10, to FIG. 3 for the graph 54, and to FIG. 4 for the process 76, preset operating parameters may be input (block 78), such as via the user interface 52. The preset operating parameters may include, for example the current and voltage required by the welder 22, a welding regime, details of the regime, etc. The engine load may then be determined based on the input settings for the welder 22 (block 80). That is, the idle speed 60, the operating speed 62, and/or the anticipated load to achieve the requisite current and voltage outputs for the welder 22 may be determined. For example, a lookup table, an algorithm, etc. may be utilized to determine the engine load, the idle speed 60, and/or the operating speed 62 required for the load. These may be determined empirically, a priori, by testing of the engine under anticipated load conditions. After the operating parameters are input, the engine 12 may idle for a period of time (block 82), for example, while the user prepares the welder 22. When the welder 22 becomes operative (e.g., an arc is struck), the controller senses a draw on the generator 14 (block 84). The controller may then send a signal to the engine governor 44, ignition/crank input 46, the fuel injector 48, the spark timer 50, etc., to begin ramping up the engine speed 56 from the idle speed 60 to the operating speed 62 (block 88). The ramp-up process may utilize an engine governor curve based on the user input settings and the anticipated operating speed 62. For example, if the welder 22 requires output power that is generated when the generator operates at a speed 62 of 3600 rpm, the controller may adjust the engine operating settings to open the engine throttle to the requisite position for operating the engine at 3600 rpm. The engine then quickly ramps up to the operating speed 62.

Figure 5:
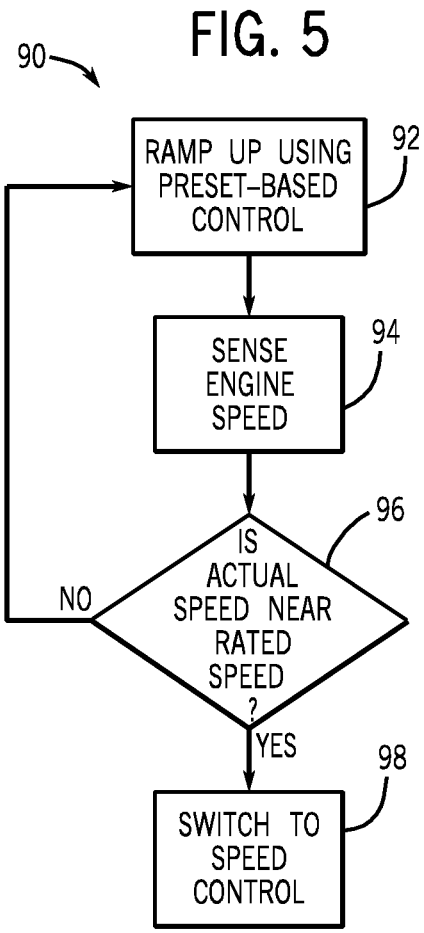
FIG. 5 is a flow chart illustrating a further engine control process for producing another series illustrated in the engine speed graph of FIG. 3 according to an embodiment of the present invention.

FIG. 5 illustrates a process 90 by which the engine control regime may be changed. Referring to FIG. 3 for the graph 54 and to FIG. 4 for the process 90, the engine speed 56 may ramp up using the preset-based control regime (block 92). The engine speed 56 may then be monitored (block 94) and compared to the target operating speed 62 (block 96). If the engine speed 56 is not near the operating speed 62, the ramp up continues using the preset-based control regime (block 92). However, if the engine speed 56 is near the operating speed 62, the rpm-based control regime may be implemented (block 98). The threshold after which the engine speed 56 may be considered "near" the operating speed 62 may be a preset value, a user-input value, a percentage of the operating speed 62, or another appropriate level.

Figure 6:
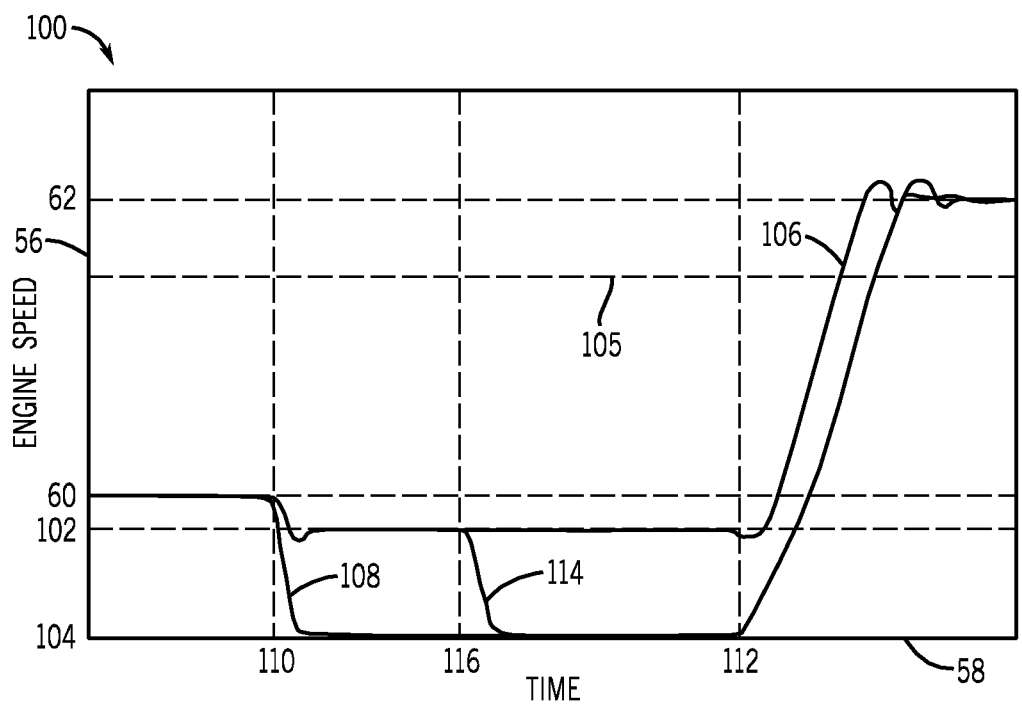
FIG. 6 is another engine speed graph according to an embodiment of the present invention.

FIG. 6 is a graph 100 of the engine speed 56 versus the time 58 in accordance with embodiments of the present invention. Referring generally to FIG. 2 for the system 10 components and to FIG. 6 for the graph 100, in addition to the idle speed 60 and the rated speed 62, a low idle speed 102 and an engine off speed 104 (i.e., stopped) are illustrated. For example, an engine with an idle speed 60 of 1800 rpm may have a low idle speed 102 of around 1600 rpm, although other low idle speeds 102 may be implemented. Reducing the engine speed 56 or turning the engine off during non-use serves to cool the engine and to reduce noise and fuel consumption when not servicing a load. In another embodiment, a high idle speed 105 may be implemented to anticipate demand of the welder 22 based on preset operating parameters. For example, if the engine has an idle speed 60 of 1800 rpm and a preset operating speed 62 of 3600 rpm, the high idle speed 105 may be approximately 3000 rpm. The high idle speed 105, for example, may enable a faster increase to the operating speed 62 when the engine idles intermittently.

Traces 106, 108, and 114 illustrate possible energy-saving techniques which may be implemented in the system 10. For example, if there is no draw on the generators after a time 110, the engine speed 56 may decrease from the idle speed 60 to the low idle speed 102 (trace 106), or operation of the engine may be temporally interrupted (trace 108), reducing the engine speed 56 to the engine off speed 104. Upon detection of a draw on the engine at a time 112, the engine speed 56 may ramp up to the operating speed 62 using any of the control techniques discussed above. Furthermore, a combination of the low idle speed 102 and the engine off speed 104 may be employed, as illustrated by a trace 114. For example, the engine speed 56 may decrease to the low idle speed 102 after the time 110 and may then decrease to the engine off speed 104 after a time 116.

In another embodiment, the engine speed 56 may initially decrease from the operating speed 62 to the high idle speed 105. Upon detection of a draw on the generators, the engine speed 56 may return to the operating speed 62. However, if there is no draw detected after the time 110, the engine speed 56 may decrease from the high idle speed 105 to a lower speed (e.g., the idle speed 60, as illustrated by the trace 109; the low idle speed 102; the engine off speed 104; or another engine speed 56). It should be noted that the times 110, 112, and 116 may be different for different idle regimes. For example, it may be desirable to maintain the engine at the high idle speed 105 for a shorter period of time than for the idle speed 60 before transitioning to a lower engine speed 56.

Figure 7:
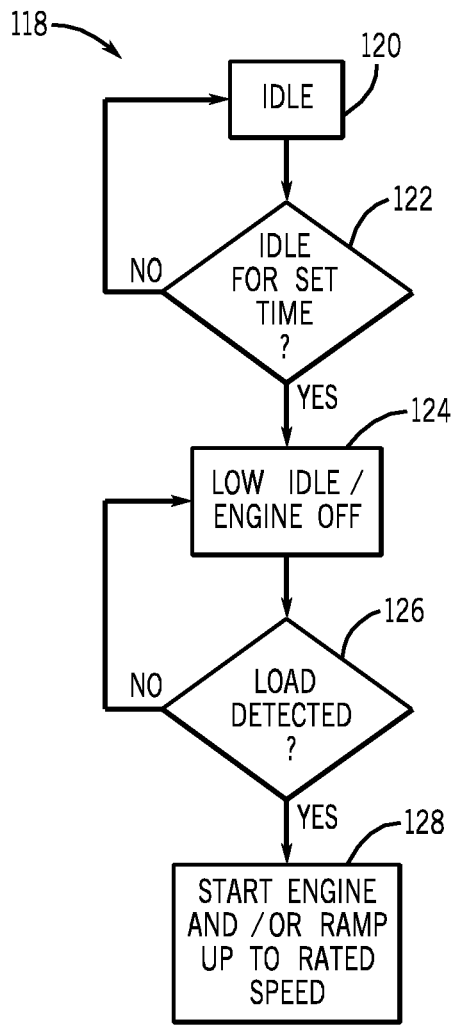
FIG. 7 is a flow chart illustrating another engine control process for producing a series illustrated in the engine speed graph of FIG. 6 according to an embodiment of the present invention.

Turning to FIG. 7, a process 118 by which the traces 106, 108, and 114 (FIG. 6) may be generated is illustrated. Referring to FIG. 2 for the system 10 components, to FIG. 6 for the graph 100, and to FIG. 7 for the process 118 steps, the engine 18 may operate at the high idle speed 105 or the idle speed 60 (block 120). The controller may monitor the current and voltage draws on the power outputs to determine if a load is drawing on the generators (block 122). If there is no draw, the engine speed 56 may be decreased to the idle speed 60 (e.g., from the high idle speed 105), to the low idle speed 102 (e.g., from the idle speed 60 or the high idle speed 105), or to the engine off speed 104 (e.g., from the idle speed 60, the low idle speed 102, or the high idle speed 105) (block 124). After the engine speed 56 decreases, the controller may continue to monitor the current and/or voltage from the generators via the sensors 36-42 (block 126). If either the welder 22 or the auxiliary load 24 draws a current and/or voltage, the engine may restart and/or the engine speed 56 may be ramped up to the operating speed 62 (block 128). In addition, a switch may be used to restart the engine after shutdown. For example, the welder 22 may include a switch so that the engine can be started remotely. If there is no draw on the generators, the engine speed 56 may remain at the idle speed 60 or the low idle speed 102, or the engine may remain off (block 124). It should be noted that while four idle/off speeds are illustrated in the graph 100 (FIG. 6) and the process 118 (FIG. 7), any number and/or combination of idle/off speeds may be implemented in accordance with the present disclosure.

Figure 8:
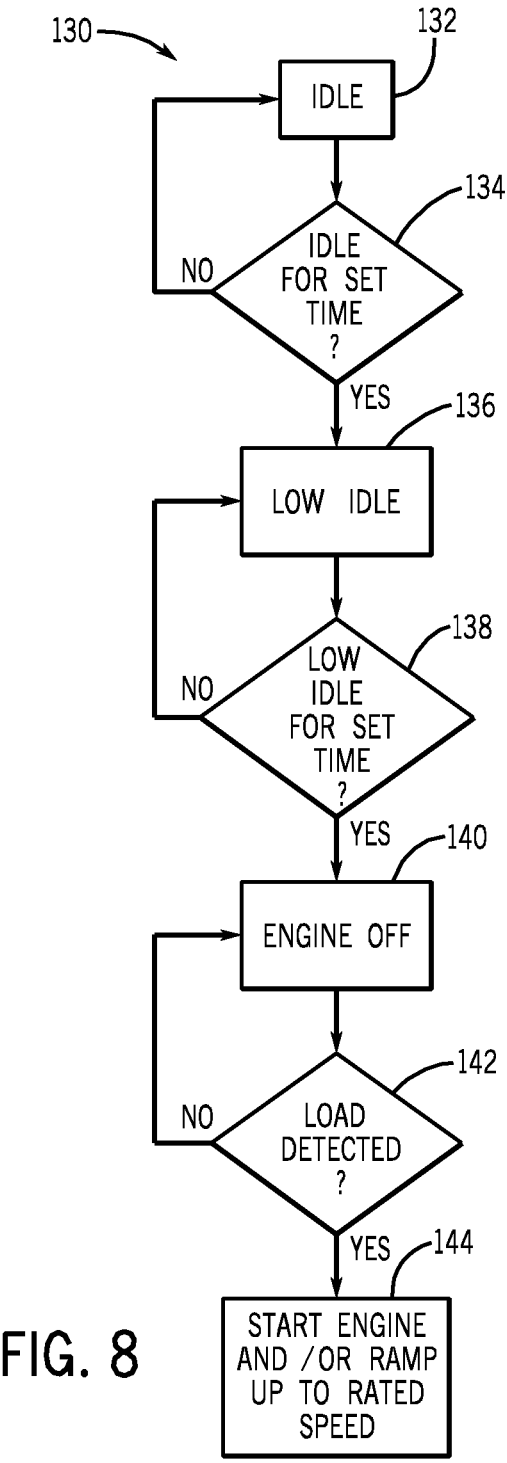
FIG. 8 is a flow chart illustrating still another engine control process for producing yet another series illustrated in the engine speed graph of FIG. 6 according to an embodiment of the present invention.

FIG. 8 illustrates a process 130 which incorporates multiple reductions in the engine speed 56, as illustrated by the trace 114 (FIG. 6). Referring to FIG. 2 for the system 10 components, to FIG. 6 for the graph 100, and to FIG. 8 for the process 130 steps, the engine may idle at the idle speed 60 (block 132). The controller may monitor the engine speed 56 and/or the current and voltage draws on the generators to determine how long the engine has been at idle (block 134). If the engine 18 has not been at idle for the predetermined time, the engine speed 56 may remain at the idle speed 60 (block 132). However, if the engine has been at idle for a predetermined time, the engine speed 56 may decrease to the low idle speed 102 (block 136). The controller may then continue to monitor the engine speed 56 to determine how long the engine has been at the low idle speed 102 (block 138). If the engine has not been at the low idle speed 102 for the predetermined time, the engine speed 56 may remain at the low idle speed 102 (block 136). If the engine has been at the low idle speed 102 for a predetermined time, the engine may be temporally shut off, decreasing the engine speed 56 to the engine off speed 104 (block 140). After the engine shuts down, the controller may continue to monitor the sensors 36-42 for a load (block 142). If either the welder 22 or the auxiliary load 24 is turned on (i.e., begin to draw power, or demand power), the engine 18 may restart and the engine speed 56 may be ramped up to the rated speed 62 (block 144). In addition, a switch may be used to restart the engine after shutdown. For example, the torch 20 may include a switch so that the engine can be started remotely. If no load is detected, the engine may remain off (block 140). It should be understood that different combinations of idle speeds may be implemented in the process 130, and any number of speeds may be employed to implement a gradual reduction in the engine speed 56.

Figure 9:
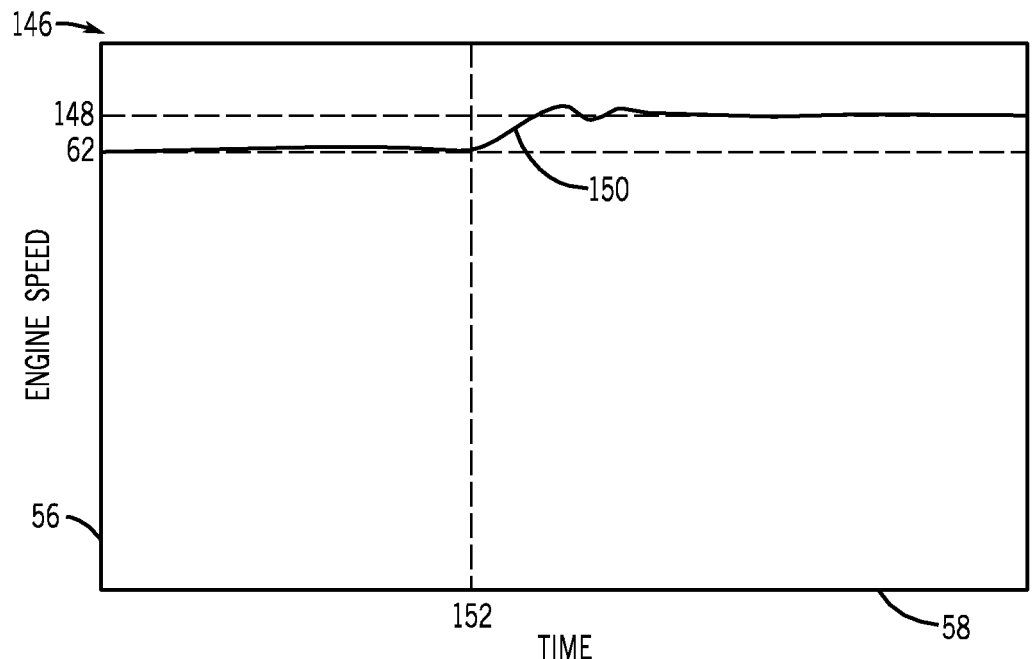
FIG. 9 is a further engine speed graph according to an embodiment of the present invention.

Turning to FIG. 9, a graph 146 of the engine speed 56 versus the time 58 is illustrated in accordance with embodiments of the present invention. FIG. 2 is generally referred to for the system 10 components, and FIG. 9 is referred to for the graph 146. In this aspect of the present invention, an "intelligent overspeed" 148 may be implemented to improve power output for welding, particularly when an auxiliary load 24 is not drawing power from generator 16 or is not sensitive to the frequency supplied by the generator 16. It may be desirable to increase the speed 56 of the engine, and therefore the output of the generator 14, when performing high-amperage processes, such as, for example, gouging, wire welding with a large wire, stick welding with a large stick, or processes involving multiple inverters. A trace 150 illustrates the use of the intelligent overspeed 148. At a time 152, the engine speed 56 may be increased from the normal operating speed 62 to a higher speed 148. The higher speed 148 may be an engine speed 56 at which the welder 22 operates more efficiently (e.g., 3700-3800 rpm for a 2-pole gasoline engine, or 2400-3000 rpm for a 4-pole diesel engine). Other speeds 148 may be implemented depending on the operating parameters of the system and the welder 22. In addition, the speed 148 may be a preset value, a user-input value, a value determined based on the weld settings, or any approximate speed.

In order to generate power at a higher frequency without damaging frequency-dependent auxiliary loads 24, it may be desirable to provide a control scheme that prevents the engine speed from increasing when a frequency-dependent auxiliary load 24 is being utilized. For example, the system may be equipped with a proprietary auxiliary power socket in addition to or in place of a standard auxiliary socket. A frequency-independent auxiliary load may have a corresponding proprietary plug such that only frequency-independent auxiliary loads may be plugged into the auxiliary power socket. In the corresponding control regime, then, the engine speed 56 may not be increased if power is being drawn from the standard power socket but may be increased if power is being drawn from the proprietary power socket. In another embodiment, the controller may determine whether an attached auxiliary load is frequency-dependent. The engine speed may be increased only if there is no frequency-dependent auxiliary load drawing power from the system. Furthermore, in another embodiment, the system may include power management technology which regulates output voltage independent of input voltage, frequency, phase, etc. For example, Auto-Line™ technology, available from Miller Electric, may provide such power stability. The auxiliary sockets may therefore have regulated power output, while the weld power output may be variable-frequency.

Figure 10:
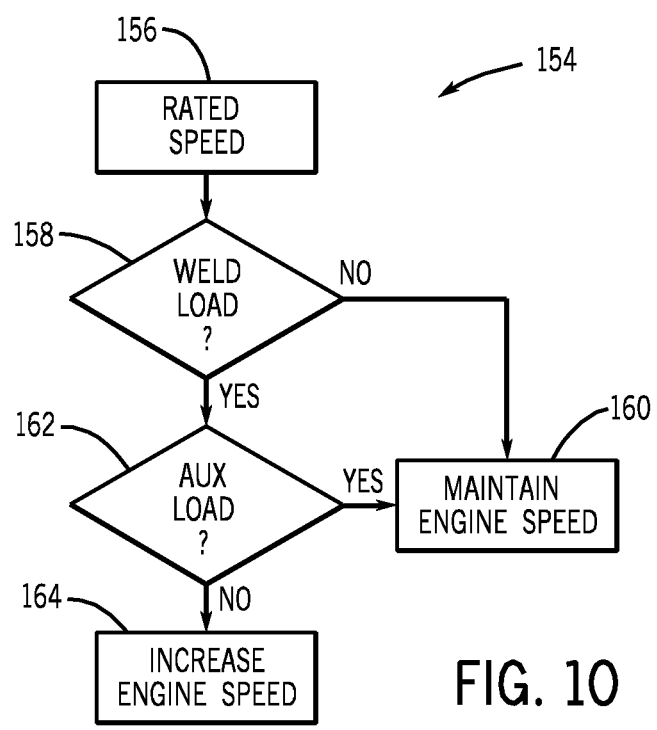
FIG. 10 is a flow chart illustrating yet another engine control process for producing a series illustrated in the engine speed graph of FIG. 9 according to an embodiment of the present invention.

FIG. 10 illustrates a process 154 by which the trace 150 (FIG. 9) may be generated. Referring to FIG. 2 for the system components, to FIG. 9 for the graph 146, and to FIG. 10 for the process 154, the engine may operate at the operating speed 62 (block 156). That is, the welder and/or the auxiliary load may draw power from the generator. Using the sensors 36-42, the controller may determine whether power is being drawn from the weld power output and/or the auxiliary power output of the generators (blocks 158 and 162). If welding power is not being drawn (i.e., the welder is not being operated), and if a frequency-dependent auxiliary load is drawing power (i.e., a frequency-dependent device is being utilized), the engine speed 56 may be maintained at the normal operating speed 62 (block 160). However, if welding power is being drawn (i.e., the welder is in use) and there is no frequency-dependent auxiliary load drawing power (i.e., no auxiliary device is in use, or only a frequency-independent auxiliary device is in use), the controller may increase the engine speed 56 to the higher speed 148 (block 164). By increasing the engine speed 56, the generators are able to output power at a higher frequency. The welding gun 14 may operate more efficiently using the higher frequency power.

Figure 11:
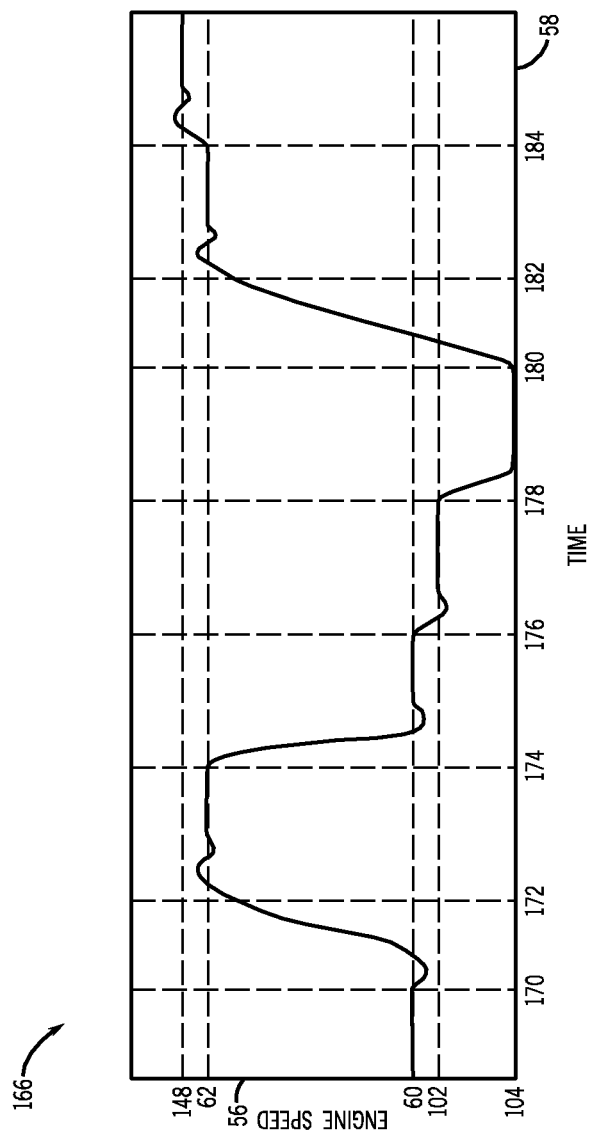
FIG. 11 is an engine speed graph produced via a combination of the engine control processes illustrated in FIGS. 4, 5, 7, and 9 according to an embodiment of the present invention.

Finally, FIG. 11 illustrates a graph 166 of the engine speed 56 versus the time 58 illustrated in accordance with embodiments of the present invention. Referring to FIG. 2 for the system 10 components and to FIG. 11 for the graph 166, a trace illustrates the combination of multiple aspects of the present invention. For example, the engine may start at the idle speed 60. At a time 170, the controller may detect a draw on the generator by the welder. Based on preset operating parameters input at the user interface, the engine speed 56 may ramp up quickly using the preset-based control regime. At a time 172, as the engine speed 56 approaches the target operating speed 62, the controller may switch to the rpm-based control regime. The engine speed 56 may then stabilize at the operating speed 62. After a time 174, the controller may determine that neither the welder nor an auxiliary load is not in use and reduce the engine speed 56 to the idle speed 60. After no detected power draw for a further time 176, the controller may reduce the engine speed 56 to the low idle speed 102. Likewise, if no draw is detected after a time 178, the controller may shut down the engine, effectively reducing the engine speed to the engine off speed 104. When a load is detected at a time 180, the controller may turn the engine on and ramp up the engine speed 56 to the operating speed 62. Once again, the controller may transition from the preset-based control regime to the rpm-based control regime at a time 182. At a time 184, if the controller determines that there is not a frequency-dependent load on the engine (e.g., only the welder is in operation, or the welder and a non-frequency dependent device are in operation), the engine speed 56 may be further ramped up to the higher speed 148.

It should be appreciated that any or all of the embodiments disclosed herein may be implemented in a single system, generator/welder, or generator. While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An engine-driven welder/generator system comprising:
an engine;
a generator powered by the engine;
a welder coupled to at least one generator and configured to supply a welding power for a welding operation based on one or more weld settings; and
an integrated controller coupled to the engine, to the generator, and to the welder, the controller configured to control operation of the engine, the welder, and the generator, the integrated controller configured to:
identify a welding load on the generator based on a sensor input;
based on the welding load, control at least one parameter of the welder and control at least one parameter of the engine, wherein controlling the at least one parameter of the engine comprises selecting an engine operating speed from a plurality of engine operating speeds, and each of the plurality of engine operating speeds is higher than an engine idle speed, wherein the integrated controller is configured to control the at least one parameter of the engine by:
in response to detecting the application of the welding load on the generator while the engine is at an engine idle speed, a high idle speed above the engine idle speed, or a low idle speed below the engine idle speed, reducing a time to ramp up the engine speed to the engine operating speed by controlling a throttle plate of the engine to start increasing the engine speed prior to a drop in engine speed that results from the initiation of the welding load, wherein the drop in engine speed occurs after the engine is at the engine idle speed, the high idle speed, or the low idle speed, and the drop in engine speed occurs before reaching the engine operating speed.

2. The engine-driven welder/generator system as defined in claim 1, wherein the at least one parameter of the engine comprises at least one of an engine governor parameter, an ignition parameter, a fuel injector parameter, or a spark timer parameter.

3. The engine-driven welder/generator system as defined in claim 1, wherein the integrated controller is configured to control at least one parameter of the generator based on the welding load.

4. The engine-driven welder/generator system as defined in claim 3, wherein the at least one parameter comprises a generator magnetic field strength.

5. The engine-driven welder/generator system as defined in claim 1, wherein the at least one welder parameter comprises a weld operating parameter or a selection of process type from at least one of a constant current process type, a constant voltage process type, a MIG process type, a TIG process type, or a Stick process type.

6. The engine-driven welder/generator system as defined in claim 5, wherein the weld operating parameter comprises at least one of a current, a voltage, a wire electrode size, or a stick electrode size.

7. The engine-driven welder/generator system as defined in claim 5, wherein the process type comprises at least one of a MIG process, a TIG process, or a stick process.

8. The engine-driven welder/generator system as defined in claim 1, wherein the sensor input comprises at least one of a current supplied by the generator or a voltage supplied by the generator.

9. The engine-driven welder/generator system as defined in claim 1, wherein the integrated controller is configured to control the throttle plate of the engine to increase the engine speed at a rate that is based on the welding load.

10. The engine-driven welder/generator system as defined in claim 1, wherein the integrated controller is configured to control the engine to idle at a plurality of idle speeds.

11. The engine-driven welder/generator system as defined in claim 10, wherein the controller is configured to selecting an engine idle speed from a plurality of engine idle speeds.

12. The engine-driven welder/generator system as defined in claim 1, wherein the integrated controller is configured to start the ramp up of the engine speed using a preset-based control regime and to switch to a speed-based control regime when the engine speed reaches a threshold speed.

\* \* \* \* \*